US010778711B2

(12) United States Patent
Maxwell et al.

(10) Patent No.: US 10,778,711 B2
(45) Date of Patent: *Sep. 15, 2020

(54) SYSTEMS AND METHODS FOR NETWORK TRAFFIC ANALYSIS

(71) Applicant: Oath Inc., Dulles, VA (US)

(72) Inventors: Lachlan A. Maxwell, Ashburn, VA (US); Donald J. McQueen, Leesburg, VA (US)

(73) Assignee: Oath Inc., Dulles, VA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/205,919

(22) Filed: Nov. 30, 2018

(65) Prior Publication Data

US 2019/0104145 A1 Apr. 4, 2019

Related U.S. Application Data

(63) Continuation of application No. 15/590,303, filed on May 9, 2017, now Pat. No. 10,178,117.

(51) Int. Cl.
*H04L 29/06* (2006.01)
*H04W 12/00* (2009.01)

(52) U.S. Cl.
CPC .......... *H04L 63/1425* (2013.01); *H04L 63/14* (2013.01); *H04L 63/1408* (2013.01);
(Continued)

(58) Field of Classification Search
CPC . H04L 63/14; H04L 63/1408; H04L 63/1416; H04L 63/1425; H04L 63/1441;
(Continued)

(56) References Cited

U.S. PATENT DOCUMENTS

| 10,063,570 B2 * | 8/2018 | Muddu ................... H04L 41/22 |
| 2009/0119173 A1 * | 5/2009 | Parsons ................ G06Q 10/107 705/319 |

(Continued)

*Primary Examiner* — Le H Luu
(74) *Attorney, Agent, or Firm* — Bookoff McAndrews, PLLC

(57) ABSTRACT

Systems and methods are disclosed for identifying malicious traffic associated with a website. One method includes receiving website traffic metadata comprising a plurality of variables, the website traffic metadata being associated with a plurality of website visitors to the website; determining a total number of occurrences associated with at least two of the plurality of variables of the website traffic metadata; generating a plurality of pairs comprising combinations of the plurality of variables of the website traffic metadata; determining a total number of occurrences associated with each pair of the plurality of pairs of combinations of the plurality of variables of the website traffic metadata; determining a plurality of visitor actions associated with the plurality of variables of the website traffic metadata; clustering each of the plurality of pairs and the plurality of visitor actions associated with the plurality of variables of the website traffic metadata into groups; and determining, based on the clustering of the plurality of pairs and the plurality of visitor actions, whether each of the plurality of website visitors are malicious visitors.

20 Claims, 5 Drawing Sheets

(52) U.S. Cl.
CPC ...... *H04L 63/1416* (2013.01); *H04L 63/1441*
(2013.01); *H04W 12/00503* (2019.01)

(58) Field of Classification Search
CPC ..... H04L 63/1446; H04L 41/22; H04L 67/06;
H04L 67/2814; H04W 12/00503; G06F
21/554; G06N 5/02; G06Q 10/107; G06Q
10/10

See application file for complete search history.

(56) References Cited

U.S. PATENT DOCUMENTS

| | | | | |
|---|---|---|---|---|
| 2009/0254971 | A1* | 10/2009 | Herz | G06Q 10/10 |
| | | | | 726/1 |
| 2012/0117644 | A1* | 5/2012 | Soeder | G06F 21/554 |
| | | | | 726/22 |
| 2012/0166583 | A1* | 6/2012 | Koonce | G06N 5/02 |
| | | | | 709/217 |
| 2012/0324113 | A1* | 12/2012 | Prince | H04L 67/2814 |
| | | | | 709/226 |
| 2015/0067819 | A1* | 3/2015 | Shribman | H04L 67/06 |
| | | | | 726/12 |
| 2017/0346851 | A1* | 11/2017 | Drake | H04L 63/1466 |

* cited by examiner

SYSTEMS AND METHODS FOR NETWORK TRAFFIC ANALYSIS

CROSS-REFERENCE TO RELATED APPLICATION(S)

This application is a continuation of and claims the benefit of U.S. Nonprovisional patent application Ser. No. 15/590,303, filed on May 9, 2017, the entirety of which is incorporated herein by reference.

TECHNICAL FIELD

The present disclosure relates to systems and methods for detecting malicious traffic in electronic networks.

BACKGROUND

In addition to typical Internet traffic coming from Internet users, many websites are subject to various forms of malicious traffic. Malicious users and bots may flood websites with comment spam, links to malicious software, and generate ingenuine clicks, visits, hits, etc. Various forms of fraud and fraudulent solicitations may also be disseminated.

This malicious traffic may consume website resources, as web servers unknowingly serve content to malicious and/or fraudulent entities such as click fraud bots. The unwanted traffic may skew website analytics and make, for example, website hit, visitor, and geographic source data unreliable. The dilution of the quality and reliability of website analytics may deter potential advertisers from advertising on a given website. Further, as malicious activity on a website increases, user and advertiser trust may erode, both damaging website revenues and branding.

Accordingly, solutions are needed to identify malicious users and malicious traffic.

SUMMARY OF THE DISCLOSURE

Embodiments of the present disclosure include systems and methods for identifying malicious traffic on a website.

According to certain embodiments, computer-implemented methods are disclosed for identifying malicious traffic on a website. One method includes receiving website traffic metadata comprising a plurality of variables, the website traffic metadata being associated with a plurality of website visitors to the website; determining a total number of occurrences associated with at least two of the plurality of variables of the website traffic metadata; generating a plurality of pairs comprising combinations of the plurality of variables of the website traffic metadata; determining a total number of occurrences associated with each pair of the plurality of pairs of combinations of the plurality of variables of the website traffic metadata; determining a plurality of visitor actions associated with the plurality of variables of the website traffic metadata; clustering each of the plurality of pairs and the plurality of visitor actions associated with the plurality of variables of the website traffic metadata into groups; and determining, based on the clustering of the plurality of pairs and the plurality of visitor actions, whether each of the plurality of website visitors are malicious visitors.

According to certain embodiments, systems are disclosed for identifying malicious traffic associated with a website. One system includes a data storage device that stores instructions for identifying malicious traffic associated with a website; and a processor configured to execute the instructions to perform a method including: receiving website traffic metadata comprising a plurality of variables, the website traffic metadata being associated with a plurality of website visitors to the website; determining a total number of occurrences associated with at least two of the plurality of variables of the website traffic metadata; generating a plurality of pairs comprising combinations of the plurality of variables of the website traffic metadata; determining a total number of occurrences associated with each pair of the plurality of pairs of combinations of the plurality of variables of the website traffic metadata; determining a plurality of visitor actions associated with the plurality of variables of the website traffic metadata; clustering each of the plurality of pairs and the plurality of visitor actions associated with the plurality of variables of the website traffic metadata into groups; and determining, based on the clustering of the plurality of pairs and the plurality of visitor actions, whether each of the plurality of website visitors are malicious visitors.

According to certain embodiments, a non-transitory computer readable medium is disclosed that stores instructions that, when executed by a computer, cause the computer to perform a method for identifying malicious traffic associated with a website. One method includes receiving website traffic metadata comprising a plurality of variables, the website traffic metadata being associated with a plurality of website visitors to the website; determining a total number of occurrences associated with at least two of the plurality of variables of the website traffic metadata; generating a plurality of pairs comprising combinations of the plurality of variables of the website traffic metadata; determining a total number of occurrences associated with each pair of the plurality of pairs of combinations of the plurality of variables of the website traffic metadata; determining a plurality of visitor actions associated with the plurality of variables of the website traffic metadata; clustering each of the plurality of pairs and the plurality of visitor actions associated with the plurality of variables of the website traffic metadata into groups; and determining, based on the clustering of the plurality of pairs and the plurality of visitor actions, whether each of the plurality of website visitors are malicious visitors.

Additional objects and advantages of the disclosed embodiments will be set forth in part in the description that follows, and in part will be apparent from the description, or may be learned by practice of the disclosed embodiments. The objects and advantages of the disclosed embodiments will be realized and attained by means of the elements and combinations particularly pointed out in the appended claims.

It is to be understood, that both the foregoing general description and the following detailed description are exemplary and explanatory only and are not restrictive of the scope of disclosed embodiments, as set forth by the claims.

BRIEF DESCRIPTION OF THE DRAWINGS

The accompanying drawings, which are incorporated in and constitute a part of this specification, illustrate various exemplary embodiments and together with the description, serve to explain the principles of the disclosed embodiments.

DETAILED DESCRIPTION OF EMBODIMENTS

Specific embodiments of the present disclosure will now be described with reference to the drawings. As will be recognized, the present disclosure is not limited to these particular embodiments. For instance, although described in the context of identifying malicious visitors, for example, using vectors and/or clustering, the present disclosure may also be used in other types of user groupings, whether grouping legitimate users or otherwise, and may be used for various purposes, including better understanding website visitor behavior.

The present disclosure relates to systems and methods for detecting malicious traffic in electronic networks. Many websites experience various forms of malicious traffic. Sites may receive comment and posting spam, or other malicious or spam content submissions. Malicious users and/or bots may further drive up hits, visitors, or ad views/clicks for various purposes. For example, malicious bots may interact with advertisements to generate additional ad revenues for website owners or ad networks. Yet, not all bots are malicious. Some bots index for search engines, for example.

This malicious and/or spam traffic may have a variety of deleterious effects. Content or comment spam may erode a user's trust in a website. Click fraud or other forms of advertisement manipulation may diminish an advertiser's trust in the value of online ads. Website owners may further find website analytics rendered less trustworthy or useless as a larger portion of web traffic becomes devoted to spam or malicious purposes.

One technique to address these forms of malicious traffic is to engage in manual analysis. A network monitor may notice a substantial increase in traffic, or receive a specific notification of possible malicious traffic by an advertising vendor. Operators, such as website publishers, may receive notifications or reports that user accounts have been compromised, or may receive evidence of spam comments being posted and/or reported. Such manual or semi-automatic techniques may further require manually tagged input of known examples of bad behavior, such that similar behavior could be identified.

Systems and methods herein disclose novel techniques for distinguishing malicious traffic from genuine network traffic. Malicious traffic may be identified automatically, and may not require sources of reliable, manually labeled input. Statistical tests of traffic may be performed, allowing a determination of an amount of likely malicious traffic associated with any given website or group of websites. As will be discussed further herein, data pairings may be generated and analyzed to determine where malicious traffic lies, such that resources to remedy the malicious traffic may be apportioned most appropriately.

Figure 1:
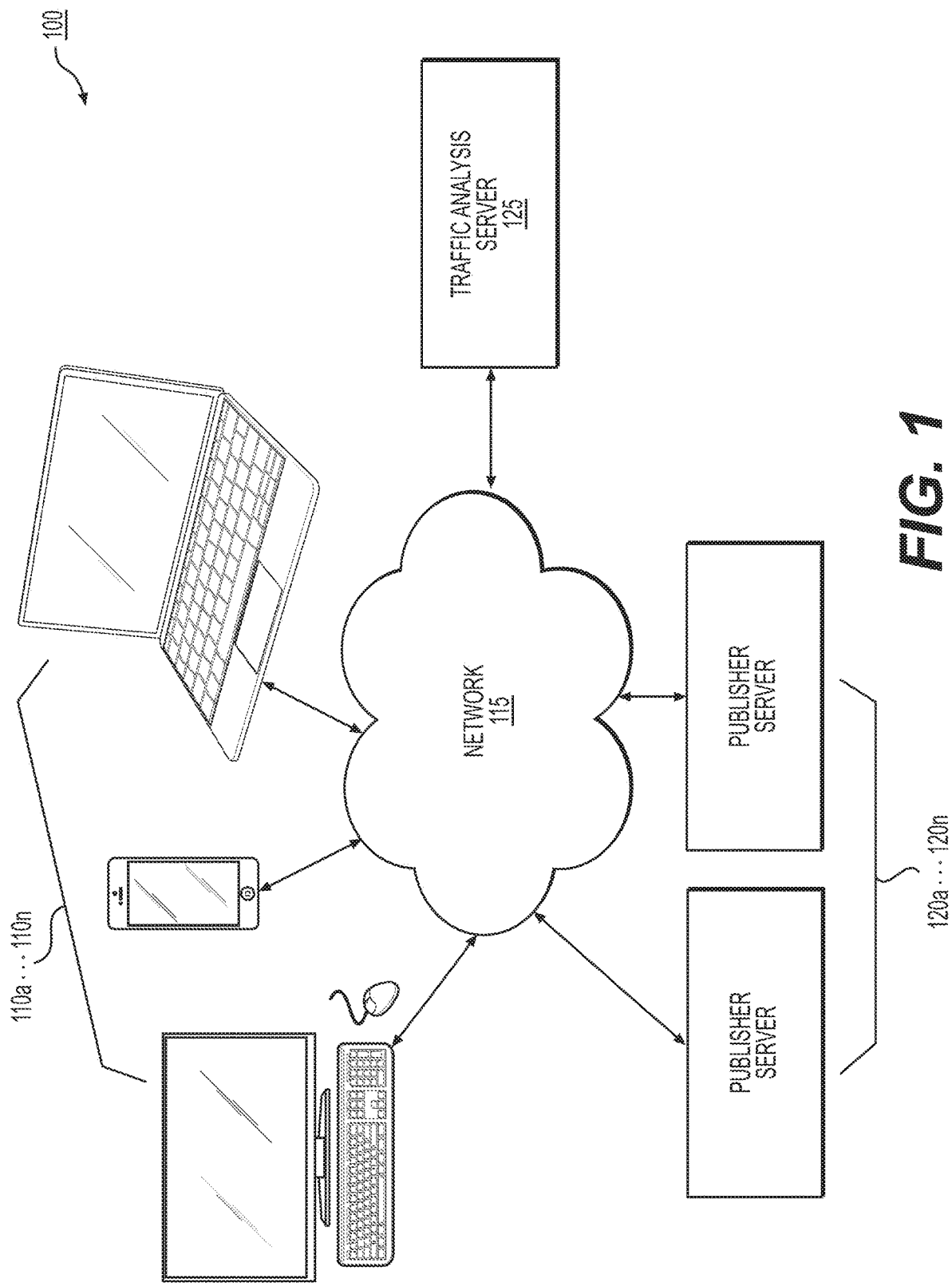
FIG. 1 depicts a schematic diagram of a network environment for identifying malicious traffic associated with a website, according to an exemplary embodiment of the present disclosure.

FIG. 1 depicts a schematic diagram of an exemplary network environment 100 for identifying malicious traffic associated with a website, according to an exemplary embodiment of the present disclosure. As shown in FIG. 1, the environment 100 may include at least one network device 110, an electronic network 115, at least one publisher server 120, and at least one traffic analysis server 125. Network devices 110 may include laptop and desktop computers, Internet-enabled mobile devices, or any Internet-enabled device. Electronic network 115 may be, for example, the Internet, but may also be or comprise a Local Area Network (LAN), Wide Area Network (WAN), Wireless Local Area Network (WLAN), Metropolitan Area Network (MAN), and/or Storage Area Network (SAN), etc. A website may be provided by the publisher server 120 to the network device 110. The publisher server 120, which may be a content delivery network (CDN), may further determine an ad server and/or an ad exchange to provide an ad included in the website provided to network device 110. The traffic analysis server 125 may analyze network traffic exchanged between network devices 110 and publisher servers 120 in accordance with techniques presented herein. Although the traffic analysis server 125 is depicted as separate from the publisher server 120, in some embodiments the functions performed by the traffic analysis server 125 may be performed on the publisher, server 120. Further, steps of the methods depicted in FIGS. 2-4 may be practiced on a combination of devices depicted in FIG. 1.

Figure 2:
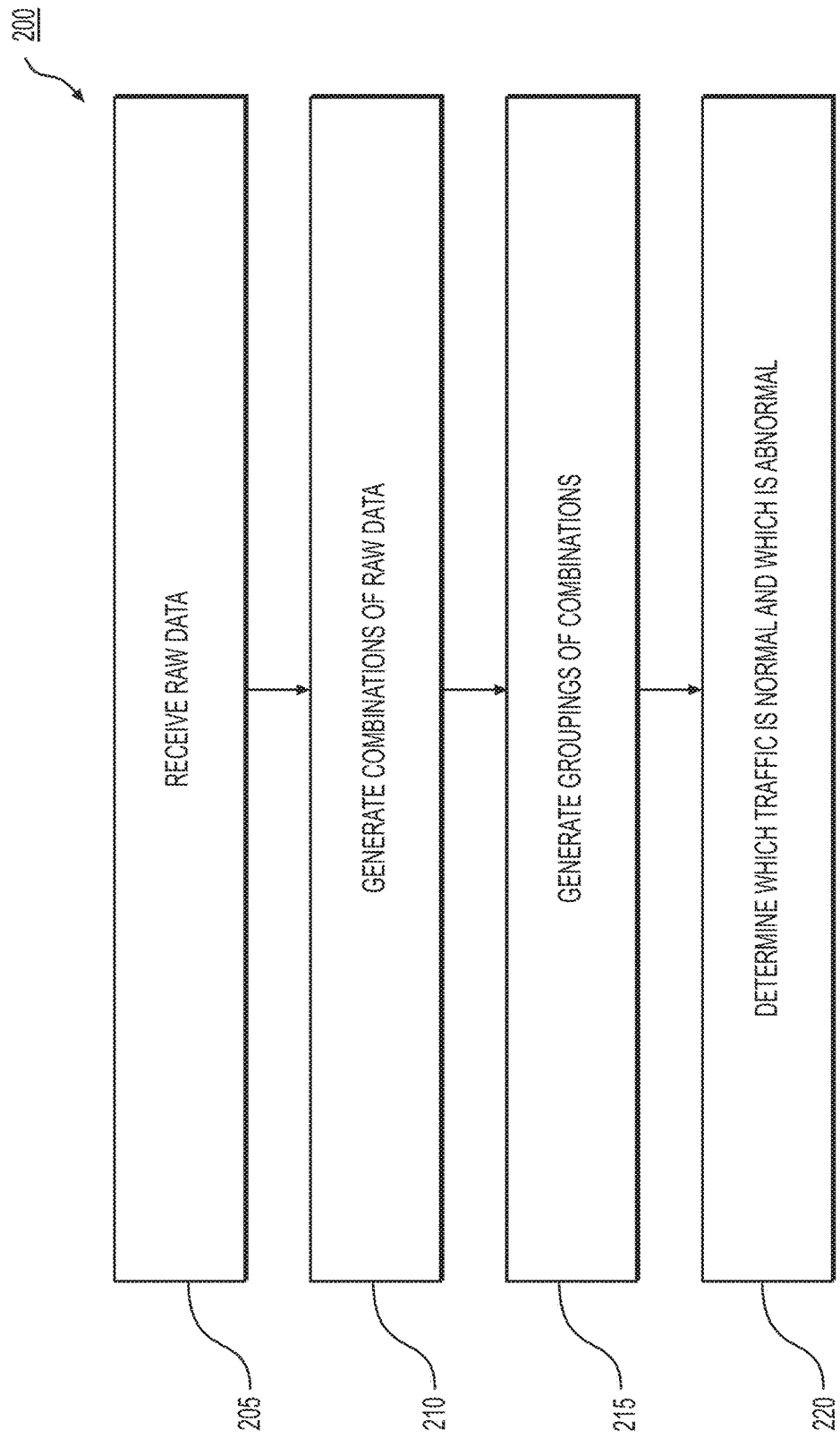
FIG. 2 depicts a flow diagram of an exemplary method for identifying malicious traffic on a website, according to an exemplary embodiment of the present disclosure.
Figure 3:
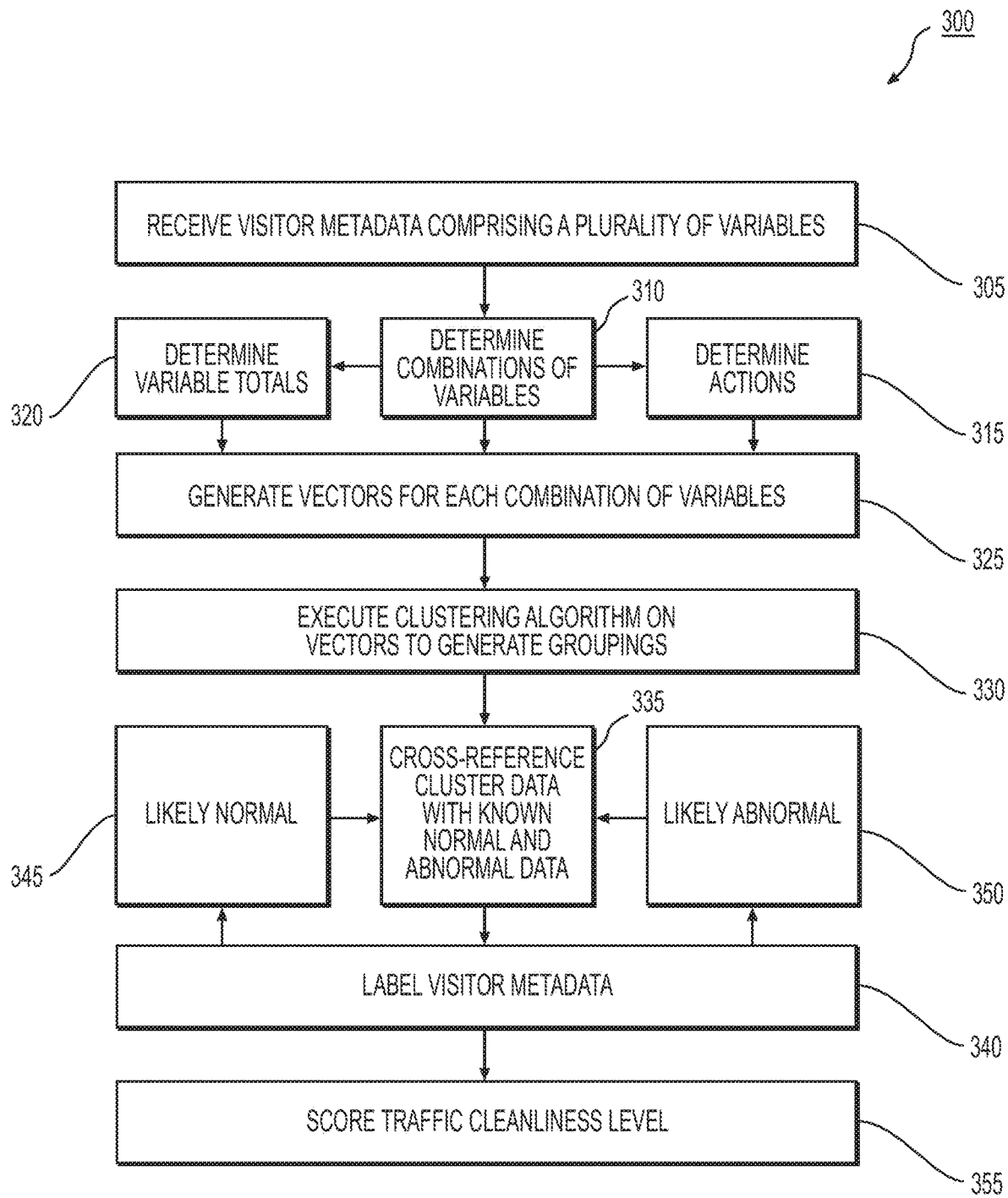
FIG. 3 depicts a flow diagram of an exemplary method for identifying and labeling malicious traffic on a website, according to an exemplary embodiment of the present disclosure.
Figure 4:
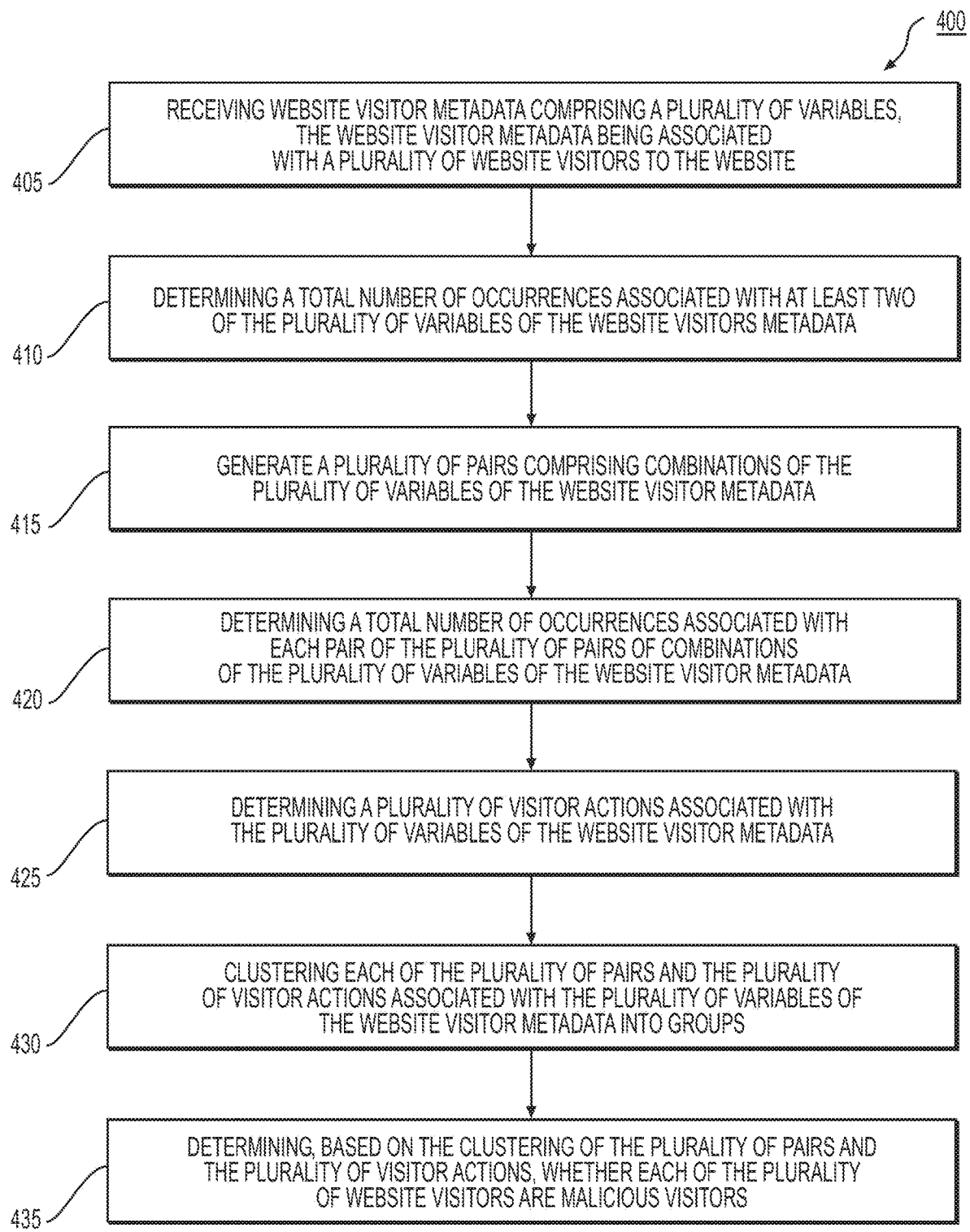
FIG. 4 depicts a flow diagram of an exemplary method for identifying malicious traffic associated with a website, according to an exemplary embodiment of the present disclosure.

FIG. 2 depicts a flow diagram of an exemplary method 200 for identifying malicious traffic on a website, according to an exemplary embodiment of the present disclosure. Although the steps shown in FIGS. 2-4 are numbered sequentially for purposes of explanation, as will be apparent, the steps do not necessarily need to be performed in the listed order. Further, while FIGS. 2-4 are discussed separately, steps discussed in relation to, for example, FIG. 2 may be implemented in the context of FIGS. 3 and/or 4, and vice versa. Generally speaking, techniques practiced in relation to any one figure may be practiced in relation to any other figure.

As shown in FIG. 2, a system, such as traffic analysis server 125, at step 205 may receive, over electronic network 115, data such as web traffic data. The data may be raw data, or processed and/or formatted data. The data may be forwarded by the publisher server 120, or received directly as the traffic analysis server 125 acts as a proxy. For example; any or all data sent between network devices 110 and publisher server 120 may first pass through traffic analysis server 125. Alternatively, the data may be periodically forwarded to the traffic analysis server 125 in batch form, or as it is sent or received to and/or from the publisher server 120. The data received may comprise browsing and other website interaction data, which may be referred to as variables, such as Internet Protocol (IP) addresses, browser and user statistics or metadata, geographic information of the IP address or other identifiers, device information such as computer make, model, type, and/or specifications, user demographic information, browsing history, web cookie data, user verification level, base directory data, landing page, and browser or other device and/or software identifiers.

At step 210, the system may process the data, for example, at the traffic analysis server 125. For example, combinations of the received data may be generated. Each instance of a variable may be organized into pairs, triplets, etc. New variables and/or additional metadata may also be determined based upon these combinations.

The accumulated data, at step 215, may be organized into related groups, the groupings being based upon a degree of relatedness. Groupings may be determined using a variety of algorithms, such as clustering algorithms.

At step 220, the traffic may be determined to be normal or abnormal based upon the groupings. Unclassified traffic grouped with known abnormal traffic may be determined to be abnormal and/or malicious. Unclassified traffic grouped with known normal traffic may be determined to be normal and/or non-malicious.

FIG. 3 depicts a flow diagram of an exemplary method 300 for identifying and labeling malicious traffic on a website, according to an exemplary embodiment of the present disclosure. At step 305, visitor metadata, or other raw data, may be received, for example, by the traffic analysis server 125. The visitor metadata may contain one or more variables related to the traffic of a website. For example, the data may be received in the form of a data log containing aggregable elements, with variables representing a source and/or destination country associated with the traffic, the presence of cookies, association with a verified account, a browser or other software-related identifier, one or more hardware identifiers, or URL base directory information.

For example, different URL base directories accessed may be indicative of the types of web requests made. Pages in the www.example.com/editor/directory may comprise portions of an editor dashboard that is unlikely to be the target of malicious traffic. In contrast the www.example.com/content/base directory may be a frequent target of click fraud, for example.

The presence of cookies may also be relevant to traffic evaluation, as entities committing, for example, click fraud may disable cookies to conceal their identity. Entities engaging in fraudulent activity further commonly do not have verified accounts, so this data may also be of use in determining whether associated traffic is genuine.

At step 310, combinations of variables may be determined. For example, pairs with combinations of variables either received in, or derived from, the visitor metadata may be organized into pairs. New variables may be created to represent these pairings. For example, the country, browser ID, and URL base directory associated with traffic variables may be combined to form "Country-URL_baseDir" and/or "BrowserID-URL_baseDir" variables. A total number of appearances in the visitor metadata for each paired variable may be tallied.

Listings of each of the actions associated with each pairing may be determined at step 315. For example, lists of all URL base directories associated with any particular country may be determined. Listings of all URL base directories with any associated browser identifiers may be determined.

Variable totals may be determined at step 320. The total number of appearances of each variable may be tallied. For example the total number of appearances for a given country in a given batch of website traffic data, or appearances of a given browser identifier in a given batch of website traffic data.

At step 325, vectors may be generated using one or more of the outputs of steps 310, 315, and 320. For each pairing generated in step 310, one or more multi-dimensional vectors may be created that may capture the distribution of the actions determined in step 315 for each variable category. For example, a vector may be generated for each country with a "Percentage_of_Country_Actions" element for each possible URL base directory that could have been visited. Directories not visited may receive a 0%. Also, for example, a set of vectors may be created with a key of the browser identifier, and with a "Percentage_of_Browser_Identifier_Actions" variable for each URL base directory that could have been visited.

For multi-dimensional vectors, the traffic may be translated into some numerical format. The traffic data may be normalized to prevent any one component of the vector from dominating the clustering. This can be done by percentages, by deviation from the mean, unnormalized, taking a log of the values, etc. Multiple methods of normalization of the vector variables may be performed iteratively to increase the likelihood of determining the most effective normalization technique.

At step 330, a clustering algorithm may be executed on the vectors. Algorithms may include one or more techniques such as k-means clustering, hierarchical clustering, expectation-maximization, biclustering, etc. The clustering algorithm may generate groupings for traffic analysis. For example, groups of countries of browser identifiers may form based on a similarity in distribution of URL base directories that were visited while sessions from those variables were browsing a given website.

The cluster data may be cross-referenced with known normal and abnormal traffic data for analysis at step 335. When a cluster contains significant representation of known sets, this is a strong indicator that other traffic in that cluster is of the same type. For example, if a cluster contains significant representation of known index bots, it may be more probable that other non-categorized members of the cluster are also index bots, and other members may be flagged or labeled accordingly. Browser cookies or IP addresses with consistent good traffic, trusted corporate egress NATs, known bad category keys, etc., may also influence the evaluation of the cluster. Clusters may also be reviewed manually. For example, clusters containing no representation from external flagging may be reviewed manually to be categorized appropriately.

At step 340, the website visitor data may be labeled. New variable keys may receive labels based on a combination of labeling of other keys in their cluster, and/or any overlapping feedback from other clustering analyses, performed. Manual review of the clusters may also affect the labeling of the website visitor data. For example, a browser identifier that browses like an index bot and comes from a corporate egress could be labeled as a good bot. However, a browser identifier that browses from unexpected countries with an unusual distribution of Visited directories may be labeled as possibly fraudulent or malicious.

Any emerging data about known good/normal entities or known bad/abnormal entities may be fed back into the infostores. Thus, at step 345, infostores containing data about variables, actions, pairings, etc. associated with normal or non-malicious behavior in previous analyses may be incorporated for analysis, and an iterative analysis may commence. Similarly, at step 350, infostores containing data about variables, actions, pairings, etc. associated with bad or malicious behavior in previous analyses may be incorporated for analysis, and an iterative analysis may commence.

After the analysis and labeling of the visitor metadata is completed, each set of clusters may be scored based on how much of the traffic is likely fraudulent or malicious. For example, the scoring may be a range from known bad to neutral/unsure, to known normal traffic. The traffic as a whole for a given website may also receive a score based on the proportion and severity of good/bad/neutral/unknown traffic found. In this manner, websites may be "graded" by their traffic.

The number of clusters that exist, the average distance between clusters, the tightness of individual clusters, and other cluster characteristics may be used in the scoring and evaluation.

In this manner, a high level of automated labeling of clusters may be achieved. In a one technique, one or more known atypical actors, such as the Google crawler, may be located among the clusters. Traffic that claims to be browser traffic, but which is placed in a cluster along with the Google crawler, may be represent one of more malicious bots that are trying to hide.

Other techniques may bootstrap with sources that may be believed to be legitimate a priori. Clusters that contain a high percentage of expected good sources of traffic likely represent real usage. Clusters that are far away from the behavior of expected good sources are likely atypical. As the usage of the framework on websites is iterated, more classes of traffic may be discovered that may be pre-labeled to expedite the processing of future sites.

FIG. 4 depicts a flow diagram of an exemplary method 400 for identifying malicious traffic associated with a website, according to an exemplary embodiment of the present disclosure. The method includes, at step 405, receiving website traffic metadata comprising a plurality of variables, the website traffic metadata being associated with a plurality of website visitors to the website. A total number of occurrences associated with at least two of the plurality of variables of the website traffic metadata may be determined at step 410. At step 415, a plurality of pairs comprising combinations of the plurality of variables of the website traffic metadata may be generated. At step 420, a total number of occurrences associated with each pair of the plurality of pairs of combinations of the plurality of variables of the website traffic metadata may be determined. At step 425, a plurality of visitor actions associated with the plurality of variables of the website traffic metadata may be determined. Each of the plurality of pairs and the plurality of visitor actions associated with the plurality of variables of the website traffic metadata may be clustered into groups at step 430. At step 435, based on the clustering of the plurality of pairs and the plurality of visitor actions, it may be determined whether each of the plurality of website visitors are malicious visitors.

The methods discussed in relation to FIGS. 2-4 substantially improve the technical field, by enabling better detection of malicious and/or fraudulent web traffic.

Figure 5:
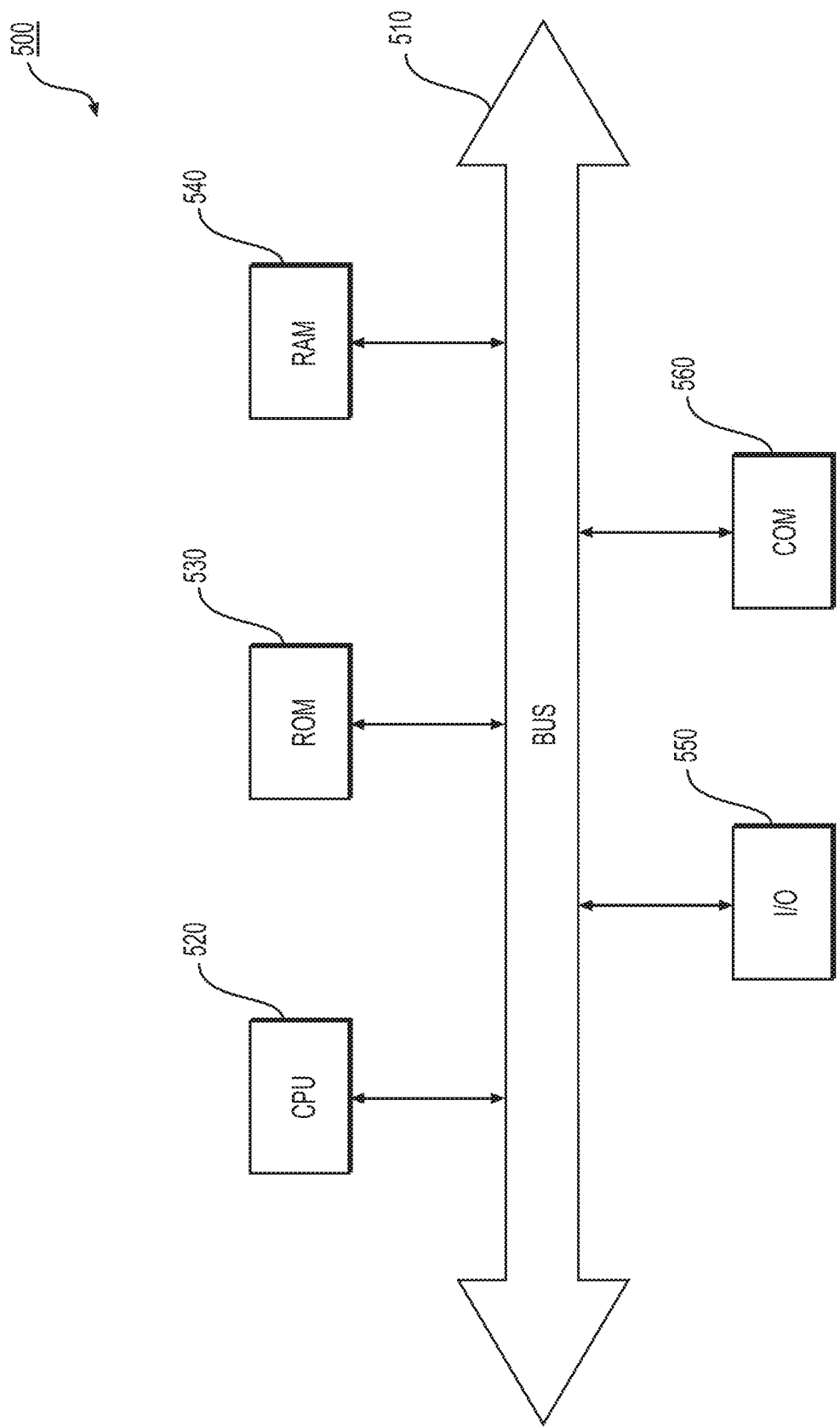
FIG. 5 is a simplified functional block diagram of a computer that may be configured as a device for executing the methods of FIGS. 2-4, according to exemplary embodiments of the present disclosure.

FIG. 5 is a simplified functional block diagram of a computer that may be configured as the network device 110s, servers, CDN, platforms, and/or exchanges for executing the methods, according to exemplary an embodiment of the present disclosure. Specifically, in one embodiment, any of the network device 110s, servers 120 or 125, CDN, platforms, and/or exchanges may be an assembly of hardware 500 including, for example, a data communication interface 560 for packet data communication. The platform may also include a central processing unit ("CPU") 520, in the form of one or more processors, for executing program instructions. The platform typically includes an internal communication bus 510, program storage, and data storage for various data files to be processed and/or communicated by the platform such as ROM 530 and RAM 540, although the system 500 often receives programming and data via network communications. The system 500 also may include input and output ports 550 to connect with input and output devices such as keyboards, mice, touchscreens, monitors, displays, eta. Of course, the various system functions may be implemented in a distributed fashion on a number of similar platforms, to distribute the processing load. Alternatively, the systems may be implemented by appropriate programming of one computer hardware platform.

Program aspects of the technology may be thought of as "products" or "articles of manufacture" typically in the form of executable code and/or associated data that is carried on or embodied in a type of machine-readable medium. "Storage" type media include any or all of the tangible memory of the computers, processors or the like, or associated modules thereof, such as various semiconductor memories, tape drives, disk drives and the like, which may provide non-transitory storage at any time for the software programming. All or portions of the software may at times be communicated through the Internet or various other telecommunication networks. Such communications, for example, may enable loading of the software from one computer or processor into another, for example, from a management server or host computer of the mobile communication network into the computer platform of a server and/or from a server to the mobile device. Thus, another type of media that may bear the software elements includes optical, electrical and electromagnetic waves, such as used across physical interfaces between local devices, through wired and optical landline networks and over various airlinks. The physical elements that carry such waves, such as wired or wireless links, optical links, or the like, also may be considered as media bearing the software. As used herein, unless restricted to non-transitory, tangible "storage" media, terms such as computer or machine "readable medium" refer to any medium that participates in providing instructions to a processor for execution.

While the presently disclosed methods, devices, and systems are described with exemplary reference to transmitting data, it should be appreciated that the presently disclosed embodiments may be applicable to any environment, such as a desktop or laptop computer, an automobile entertainment system, a home entertainment system, etc. Also, the presently disclosed embodiments may be applicable to any type of Internet protocol.

Other embodiments of the disclosure will be apparent to those skilled in the art from consideration of the specification and practice of the disclosure disclosed herein. It is intended that the specification and examples be considered as exemplary only, with a true scope and spirit of the disclosure being indicated by the following claims.

The invention claimed is:

1. A computer-implemented method for identifying malicious traffic associated with a website, comprising:
   receiving website traffic data comprising a plurality of variables, the website traffic data being associated with a plurality of website visitors to the website;
   determining a total number of occurrences associated with at least two of the plurality of variables of the website traffic data;
   generating a plurality of pairs comprising combinations of the plurality of variables of the website traffic data;
   clustering each of the plurality of pairs into groups; and
   determining, based on the clustering of the plurality of pairs, whether each of the plurality of website visitors are malicious visitors.

2. The method of claim 1, wherein clustering each of the plurality of pairs into groups and determining whether each of the plurality of website visitors are malicious visitors further comprise:
- determining a total number of occurrences associated with each pair of the plurality of pairs of combinations of the plurality of variables of the website traffic data;
- determining a plurality of visitor actions associated with the plurality of variables of the website traffic data;
- clustering each of the plurality of pairs and the plurality of visitor actions associated with the plurality of variables of the website traffic data; and
- determining, based on the clustering of the plurality of pairs and the plurality of visitor actions, whether each of the plurality of website visitors are malicious visitors.

3. The method of claim 2, wherein clustering each of the plurality of pairs and the plurality of visitor actions comprises:
- generating a plurality of multi-dimensional vectors for each of the plurality of pairs of combinations of the plurality of variables of the website traffic data; and
- executing a clustering algorithm on the vectors to generate the groups.

4. The method of claim 1, wherein determining whether each of the plurality of website visitors are malicious visitors comprises cross-referencing each member of the groups with known trusted visitors.

5. The method of claim 1, wherein determining whether each of the plurality of website visitors are malicious visitors comprises cross-referencing each member of the groups with known malicious visitors.

6. The method of claim 1, further comprising labeling values of each of the plurality of variables based upon the determination whether each of the plurality of website visitors are malicious visitors.

7. The method of claim 1, further comprising determining a proportion of malicious traffic to the website based on the determined malicious visitors.

8. The method of claim 1, wherein the plurality of variables comprise at least one of a country of origin of data packets associated with the plurality of website visitors, geographic area of origin of data packets associated with the plurality of website visitors, an Internet Protocol (IP) address of data packets associated with the plurality of website visitors, a browser identifier associated with the plurality of website visitors, and Uniform Resource Locator (URL) base directory associated with the plurality of website visitors.

9. A system for identifying malicious traffic associated with a website, the system including:
- a data storage device that stores instructions for identifying malicious traffic associated with a website; and
- a processor configured to execute the instructions to perform a method including:
  - receiving website traffic data comprising a plurality of variables, the website traffic data being associated with a plurality of website visitors to the website;
  - determining a total number of occurrences associated with at least two of the plurality of variables of the website traffic data;
  - generating a plurality of pairs comprising combinations of the plurality of variables of the website traffic data;
  - clustering each of the plurality of pairs into groups; and
  - determining, based on the clustering of the plurality of pairs, whether each of the plurality of website visitors are malicious visitors.

10. The system of claim 9, wherein clustering each of the plurality of pairs into groups and determining whether each of the plurality of website visitors are malicious visitors further comprise:
- determining a total number of occurrences associated with each pair of the plurality of pairs of combinations of the plurality of variables of the website traffic data;
- determining a plurality of visitor actions associated with the plurality of variables of the website traffic data;
- clustering each of the plurality of pairs and the plurality of visitor actions associated with the plurality of variables of the website traffic data; and
- determining, based on the clustering of the plurality of pairs and the plurality of visitor actions, whether each of the plurality of website visitors are malicious visitors.

11. The system of claim 10, wherein clustering each of the plurality of pairs and the plurality of visitor actions further comprises:
- generating a plurality of multi-dimensional vectors for each of the plurality of pairs of combinations of the plurality of variables of the website traffic data; and
- executing a clustering algorithm on the vectors to generate the groups.

12. The system of claim 9, wherein determining whether each of the plurality of website visitors are malicious visitors comprises cross-referencing each member of the groups with known trusted visitors.

13. The system of claim 9, wherein determining whether each of the plurality of website visitors are malicious visitors comprises cross-referencing each member of the groups with known malicious visitors.

14. The system of claim 9, further comprising labeling values of each of the plurality of variables based upon the determination whether each of the plurality of website visitors are malicious visitors.

15. The system of claim 9, further comprising determining a proportion of malicious traffic to the website based on the determined malicious visitors.

16. The system of claim 9, wherein the plurality of variables comprise at least one of a country of origin of data packets associated with the plurality of website visitors, geographic area of origin of data packets associated with the plurality of website visitors, an Internet Protocol (IP) address of data packets associated with the plurality of website visitors, a browser identifier associated with the plurality of website visitors, and Uniform Resource Locator (URL) base directory associated with the plurality of website visitors.

17. A non-transitory computer-readable medium storing instructions that, when executed by a computer, cause the computer to perform a method for identifying malicious traffic associated with a website, the method including:
- receiving website traffic data comprising a plurality of variables, the website traffic data being associated with a plurality of website visitors to the website;
- determining a total number of occurrences associated with at least two of the plurality of variables of the website traffic data;
- generating a plurality of pairs comprising combinations of the plurality of variables of the website traffic data;
- clustering each of the plurality of pairs into groups; and determining, based on the clustering of the plurality of pairs, whether each of the plurality of website visitors are malicious visitors.

18. The computer-readable medium of claim 17, wherein clustering each of the plurality of pairs into groups and determining whether each of the plurality of website visitors are malicious visitors further comprise:
   determining a total number of occurrences associated with each pair of the plurality of pairs of combinations of the plurality of variables of the website traffic data;
   determining a plurality of visitor actions associated with the plurality of variables of the website traffic data;
   clustering each of the plurality of pairs and the plurality of visitor actions associated with the plurality of variables of the website traffic data; and
   determining, based on the clustering of the plurality of pairs and the plurality of visitor actions, whether each of the plurality of website visitors are malicious visitors.

19. The computer-readable medium of claim 18, wherein clustering each of the plurality of pairs and the plurality of visitor actions further comprises:
   generating a plurality of multi-dimensional vectors for each of the plurality of pairs of combinations of the plurality of variables of the website traffic data; and
   executing a clustering algorithm on the vectors to generate the groups.

20. The computer-readable medium of claim 17, wherein determining whether each of the plurality of website visitors are malicious visitors comprises cross-referencing each member of the groups with known trusted visitors.

* * * * *